(12) United States Patent
Brombach et al.

(10) Patent No.: US 12,257,920 B2
(45) Date of Patent: Mar. 25, 2025

(54) AC CHARGING STATION FOR CHARGING ELECTRIC VEHICLES WITH PHASE CHANGE

(71) Applicant: Wobben Properties GmbH, Aurich (DE)

(72) Inventors: Johannes Brombach, Berlin (DE); Christian Strafiel, Aurich (DE); Alfred Beekmann, Wiesmoor (DE)

(73) Assignee: Wobben Properties GmbH, Aurich (DE)

( * ) Notice: Subject to any disclaimer, the term of this patent is extended or adjusted under 35 U.S.C. 154(b) by 435 days.

(21) Appl. No.: 17/436,340

(22) PCT Filed: Mar. 4, 2020

(86) PCT No.: PCT/EP2020/055700
§ 371 (c)(1),
(2) Date: Sep. 3, 2021

(87) PCT Pub. No.: WO2020/178341
PCT Pub. Date: Sep. 10, 2020

(65) Prior Publication Data
US 2022/0185141 A1    Jun. 16, 2022

(30) Foreign Application Priority Data
Mar. 6, 2019    (DE) ..................... 10 2019 105 661.6

(51) Int. Cl.
*B60L 53/67*    (2019.01)
*B60L 53/10*    (2019.01)
(Continued)

(52) U.S. Cl.
CPC ............... *B60L 53/67* (2019.02); *B60L 53/11* (2019.02); *H02J 3/26* (2013.01); *B60L 53/63* (2019.02)

(58) Field of Classification Search
CPC .......... B60L 53/67; B60L 53/11; B60L 53/63; H02J 3/26
See application file for complete search history.

(56) References Cited

U.S. PATENT DOCUMENTS

| | | | |
|---|---|---|---|
| 10,106,043 B2 | 10/2018 | Weber et al. | |
| 2014/0021917 A1* | 1/2014 | Paupert | B60L 53/68 320/109 |

(Continued)

FOREIGN PATENT DOCUMENTS

| | | | |
|---|---|---|---|
| CN | 106099962 A | | 11/2016 |
| CN | 107681672 A | * | 2/2018 |

(Continued)

OTHER PUBLICATIONS

Machine translation of CN-107681672-A (Year: 2023).*

*Primary Examiner* — David V Henze-Gongola
(74) *Attorney, Agent, or Firm* — Seed IP Law Group LLP

(57) ABSTRACT

A charging station for charging electric vehicles is provided. The charging station includes a plurality of AC charging terminals, each for charging an electric vehicle by means of alternating current. Each of the AC charging terminals is connected to a three-phase power supply via a respective phase-change device in order to be supplied thereby with three-phase electric current. The power supply has three supply lines for providing three voltage phases, and each AC charging terminal has three connection lines for connection to the three supply lines, for applying the three voltage phases to the connection lines. Each phase-change device is set up to change a connection assignment between the three supply lines and the three connection lines.

17 Claims, 2 Drawing Sheets

(51) Int. Cl.
*B60L 53/63* (2019.01)
*H02J 3/26* (2006.01)

(56) References Cited

U.S. PATENT DOCUMENTS

| | | | |
|---|---|---|---|
| 2016/0327615 A1* | 11/2016 | Wallace | ................ G01R 31/52 |
| 2018/0162229 A1 | 6/2018 | Götz et al. | |
| 2020/0180453 A1* | 6/2020 | Pfeilschifter | ........... B60L 58/20 |
| 2021/0101500 A1 | 4/2021 | Brombach et al. | |

FOREIGN PATENT DOCUMENTS

| | | |
|---|---|---|
| CN | 108233499 A | 6/2018 |
| DE | 102010024138 A1 | 12/2011 |
| DE | 102013204256 A1 | 9/2014 |
| DE | 102017116886 A1 | 1/2019 |
| EP | 3184352 A1 | 6/2017 |
| EP | 3549814 A1 | 10/2019 |
| WO | 2012/128626 A2 | 9/2012 |
| WO | 2020/178341 A1 | 9/2020 |

\* cited by examiner

AC CHARGING STATION FOR CHARGING ELECTRIC VEHICLES WITH PHASE CHANGE

BACKGROUND

Technical Field

The present invention relates to a charging station for charging electric vehicles and it also relates to a method for charging electric vehicles.

Description of the Related Art

Electric vehicles are becoming increasingly popular and so ever more and ever larger charging stations are required to charge the electric vehicles. Large charging stations, which can also be referred to as electric charging points, can charge many electric vehicles with electricity at the same time. Such a charging station usually receives the power required for this from an electrical supply grid to which it can be connected via a grid connection point. Particularly in the case of large charging stations, their power requirements can have a noticeable impact on the electrical supply grid. In this case, grid sections or the grid connection point can sometimes reach a performance limit.

To counter this, the electrical supply grid and/or the grid connection point can be expanded with regard to the performance or the ability to transmit power.

However, it is not only the level of performance that can be problematic, but also the quality of the current, which can be influenced by the charging station. A charging station for charging electric vehicles in this case converts the electrical three-phase alternating current, which is drawn from the electrical supply grid, respectively into direct current. Different charging technologies can be installed in the various types of electric vehicle. In addition to rapid DC charging options, almost all vehicles, at least many vehicles, also have so-called in-vehicle chargers installed. These in-vehicle chargers convert an alternating current into a direct current themselves, that is to say they have an AC input and can therefore also be referred to synonymously as AC chargers. Such in-vehicle chargers are connected to an AC connection either in a single-phase, two-phase or three-phase manner. In this case, the electric vehicle is thus supplied with single-phase, two-phase or three-phase alternating current and the conversion into direct current, that is to say into a DC charging current, only takes place in the electric vehicle.

Which phases of a three-phase supply line, which is connected directly or indirectly to the electrical supply grid, especially at the grid connection point, are loaded is mostly random. This can lead to a severe imbalance of the AC system when several vehicles are to be charged. If, for example, to use a very simplistic example, three electric vehicles are charged via their in-vehicle charger, which in each case only operates in a single-phase manner, the load on the three-phase system in the charging station can be even if each in-vehicle charger in each case draws its current from a different one of the three phases. But if, for example, all three vehicles with their in-vehicle charger randomly draw their current from the same phase, for example from the first phase, this first phase is heavily loaded and the second and third phases are not loaded or are loaded to a lesser extent. This accordingly results in an imbalanced load that can affect the electrical supply grid from the charging station.

To counter this problem, an attempt can be made to specify one of the three phases as the preferred phase at each AC charging point, that is to say at which an electric vehicle with an in-vehicle charger is to be connected, with this preferred phase changing from one AC charging point to the next. However, this is unable to take into account the fact that the in-vehicle chargers require different amounts of current depending on the vehicle and state of charge. If, for example, of six AC charging points, in each case two are provided for the first, two for the second and two for the third phase, an imbalance can still occur if, for example, two vehicles require only a little charging current at both AC charging points in the first phase, whereas two vehicles that require a high charging current are connected to two additional AC charging points for the second phase. The same applies if electric vehicles are connected and charged at the six AC charging points mentioned as an example, for example only at the two AC charging points for the first phase.

In addition to single-phase in-vehicle chargers, there are also two-phase and three-phase in-vehicle chargers.

It can also happen that, for example, in so-called fleet operations, where a transport or logistics company has many electric vehicles and operates its own charging station, many AC charging points are combined with few rapid charging points. This is due to the fact that, in such a case, the vehicles in the fleet are often charged in a continuous overnight charging operation, for which many AC charging points are required. In addition to this, however, a few rapid charging points can be provided if a vehicle in the fleet has to be charged in the meantime and such charging cannot wait until it is charged overnight. Such rapid charging points are those which have DC choppers for providing a DC charging current in order to generate high direct currents for rapid charging. Such DC choppers as part of the rapid charging points are then part of the charging station and can be connected in a three-phase manner to a corresponding three-phase supply line in the charging station. It should therefore also be noted that some charging stations have such a combination of DC chargers and AC charging points.

Such a structure can also influence the balance of the three-phase supply system in the charging station and thus the balance in the electrical supply grid to which the charging station is connected.

The German Patent and Trademark Office has searched the following prior art in the priority application relating to the present application: DE 10 2013 204 256 A1, DE 10 2017 116 886 A1, EP 3 184 352 A1, EP 3 549 814 A1, WO 2012/128 626 A2.

BRIEF SUMMARY

Provided is charging station that achieves a balanced loading of a three-phase supply connection.

Provided is a charging station for charging electric vehicles with several AC charging terminals. Each AC charging terminal is designed in each case to charge an electric vehicle by means of alternating current. Furthermore, each AC charging terminal is connected in each case to a three-phase power supply via a phase-change device in order to be supplied thereby with three-phase electric current. The power supply thus has three supply lines for providing three voltage phases. Each of the three supply lines thus has in each case a voltage phase during operation. For this purpose, for example, a three-wire cable or a corresponding rail system with at least three rails can be provided.

Each AC charging terminal, which can also be referred to synonymously as an AC voltage charging terminal, has three connection lines for connection to the three supply lines of the power supply, in order to apply the three voltage phases of the three supply lines to the three connection lines. A supply line is therefore electrically connected to a connection line in each case. In this way, each AC charging terminal is thus connected to the power supply.

Each phase-change device is set up to change a connection assignment between the three supply lines and the three connection lines. For example, at an AC charging terminal, the first connection line can be connected to the first supply line and the second connection line can be connected to the second supply line and finally the third connection line can be connected to the third supply line. The phase-change device can change this assignment, for example for the example mentioned to an assignment in which, after a change, the first connection line is electrically connected to the second supply line, the second connection line is electrically connected to the third supply line and the third connection line is electrically connected to the first supply line. Yet another change can also be made, after which, to stay with the last-mentioned example, the first connection line is electrically connected to the third supply line, the second connection line is electrically connected to the first supply line and the third connection line is electrically connected to the second supply line.

These two changes in the line assignment, described by way of example, and thus a change in the phase assignment can also be understood as a rotation of this assignment, and in this respect the phase-change devices can each also be designed as phase rotation devices. Theoretically, however, further changes in the assignment between connection lines and supply lines also come into consideration, for example, to take up the above example again, so that the first connection line is connected to the first supply line, but the second connection line is connected to the third supply line and the third connection line is connected to the second supply line.

This change is used to change the load on the three phases. As long as each AC terminal in each case only accesses one phase or, when accessing two or three phases, accesses these in the same way, that is to say draws the same amount of current, the last-mentioned change, in which only the last two phases were swapped, is basically superfluous. It would then suffice if the phase-change device can only advance or turn back in each case the connection for all three lines by one step, or for all three lines by two steps.

The phase-change device can in principle be designed mechanically, in which even a rotary switch or slide switch always changes the electrical connection for three phases, that is to say for each of the three lines mentioned. However, it is also possible to implement this using power semiconductor switches, for example using insulated-gate bipolar transistors (IGBTs) or using thyristors. The use of power semiconductor switches has the advantage that electronic control of these phase-change devices can be better achieved and that no signs of wear and tear can occur on switch contacts.

This use of the phase-change devices ensures that the connection lines can each be connected to the supply lines in such a way that, as far as possible, all three phases are loaded equally. Since all AC charging terminals, at least all AC charging terminals considered, have such phase-change devices, a load on the three phases that is as uniform as possible can be achieved for all of these AC charging terminals.

A preferred embodiment, which can also be combined well with the other embodiments, consists in already providing a type of static phase balancing. For this purpose, it is proposed to switch all phase-change devices of the AC charging terminals that are not being used at the moment evenly between a position of 0°, 120° and 240°. This applies in particular to the case when the phase-change devices are designed as phase rotation devices, but the same result can also be achieved using other phase-change devices. Of the AC charging terminals that are not being used at the moment, one is therefore set or switched so that the first phase of the power supply, which is referred to here as 0°, is switched to the first connection line and, accordingly, the second phase is switched to the second and the third phase is switched to the third connection line.

In the case of another unused AC charging terminal, the first connection line is switched to the second phase of the power supply, that is to say the second supply line, and accordingly the second connection line is switched to the third phase and the third connection line is switched to the first phase. In the case of another AC charging terminal that is not being used at the moment, the first connection line is switched to the third phase, that is to say 240°, the second connection line is accordingly switched to the first phase and the third connection line is switched to the second phase.

This is based on the idea that single-phase in-vehicle chargers in particular are prepared by their connector in such a way that they always use the same connector pin as the active connector pin in the connector and thus always get their current from the same connection line, that is to say for example always from the first connection line. However, this proposed static phase balancing now ensures that the first connection line is always connected to different supply lines. A one-sided loading of a connection line due to structure as described is thus distributed as evenly as possible to the three supply lines by the phase-change devices, and a large first step in the direction of balanced loading can already thus be taken. It should also be noted that this static phase balancing, in which the phase-change devices of the unused AC charging points are preset, is carried out in the off state and thus leads to a low load or low wear of the components involved, especially the phase-change device.

A balancing control system is preferably provided for controlling the phase-change device, wherein the balancing control system is prepared to control the phase-change devices in order to reduce, in particular to minimize, a phase imbalance of the supply lines. Ideally, a phase balance of the supply lines, that is to say of the three phases, is achieved. Whether phase balancing actually succeeds also depends in particular on how many AC charging terminals the charging station has and, of course, what accuracy is used as a basis for such a phase balancing.

In particular, the balancing control system is designed so that it also quantitatively detects an imbalance of the three phases of the power supply and can control the phase-change devices individually in order to find and make a respective suitable setting for each phase-change device.

In addition or as an alternative, the balancing control system can also quantitatively detect the individual phase loads of each AC charging terminal and, depending on this, individually find a suitable connection assignment for each AC charging terminal, which leads to the most balanced load possible for all AC charging terminals of the charging station.

The balancing control system preferably has both of the aforementioned items of information, that is, both the information on the individual loads on the individual AC charging terminals and the overall load or phase distribution of the power supply. The particular underlying idea here is that an imbalance in the three phases of the power supply is not only due to the AC charging terminals, but can also depend on other connected loads. In this case, namely the information about the load on each AC charging terminal would not allow conclusions to be drawn about the overall load situation of the three phases of the power supply. For example, at least one active three-phase rectifier can be connected in the charging station, which can also lead to an imbalanced load on the three phases of the power supply.

According to one configuration, it is proposed that the balancing control system is prepared to sort the AC charging terminals according to their present current consumption and to control the phase-change devices depending thereon in order to minimize the phase imbalance of the supply lines. In this way, it is possible to avoid a complex optimization program, which could furthermore or alternatively be implemented in the balancing control system, which is also proposed according to an embodiment.

This particularly means that the AC charging terminals with the greatest present current consumption can be viewed first and set to minimize imbalanced loading. The AC charging terminals with the greatest current load therefore also have the greatest influence on the imbalanced load. Further AC charging terminals with lower current consumption can then be set downstream, for example. Even if the optimal setting of all phase-change devices of the AC charging terminals is possibly not achieved as a result, a comparatively good result can thus still be achieved with significantly less optimization effort.

Furthermore or alternatively, it is proposed to sort the AC charging terminals according to whether they operate in a single-phase, two-phase or three-phase manner. This is based on the idea here that, depending on whether operation takes place in a single-phase, two-phase or three-phase manner, changing the phase assignment will accordingly have different effects. This can be taken into account in a first step through such a sorting process.

The balancing control system may not be able to determine directly whether a single-phase, two-phase or three-phase so-called in-vehicle charger is connected in each case. However, in any case according to one embodiment, it can in each case detect the current of the three connection lines of the relevant AC charging terminal and use this to identify which of the three connection lines carries a current and which does not. Such a measurement therefore shows whether the corresponding AC charging terminal is operating in a single-phase, two-phase or three-phase manner.

If it has now been recognized that an AC terminal is operating in a three-phase manner, this can be expediently sorted out or sorted backwards for the consideration of the balancing control. Furthermore, the sorting can provide that AC charging terminals that operate in a single-phase manner are sorted to the front and those that operate in a two-phase manner are considered sorted to the rear, that is to say are considered to be of secondary importance. At the least it makes sense to sort AC charging terminals operating in a single-phase manner and AC charging terminals operating in a two-phase manner into different groups. This is namely also based on the idea that, when rotating all three phases in the single-phase case, one phase is actually completely changed, that is to say, for example, a change is made from a full load in the first phase to a full load in the second phase.

When changing all three phases of a two-phase AC charging terminal, in fact only one of the two loaded phases is changed, however. For example, a change is made from uniform loading of the first and second phases to uniform loading of the second and third phases. In fact, this did not change the loading of the second phase.

It is particularly preferred to combine these two sorting processes and initially sort according to the criterion of whether an AC charging terminal operates in a single-phase, two-phase or three-phase manner and then sort into the three resulting groups or, after sorting out the three-phase group, into the remaining two groups according to the present current consumption. Then, for example, the single-phase charging terminals with the highest current can be changed for a first equalization of the load and then the AC charging terminals with the highest current operating in a two-phase manner can be used for a further equalization.

However, it is also possible that a sorting process according to whether the AC charging terminals operate in a single-phase, two-phase or three-phase manner is dispensed with if it turns out that single-phase in-vehicle chargers are established and therefore only single-phase in-vehicle chargers are to be expected anyway and that means that only AC charging terminals that operate in a single-phase manner can be expected anyway. Occasional inaccuracies due to the fact that a two-phase in-vehicle charger does occur can be accepted if, as described, the control effort can be reduced as a result.

According to one embodiment, it is proposed that the balancing control system is prepared to sort the AC charging terminals in particular with single-phase or two-phase current consumption according to their present current consumption and to do this in such a way that, for each of these AC charging terminals, in each case the connection line with the greatest current consumption is identified as the line with the maximum load and in each case its current consumption is taken into account as the maximum phase current of the AC charging terminal. Based on this, the AC charging terminals are then sorted according to their maximum phase current in a current sequence. Furthermore, the balancing control system is prepared so that the phase-change device in each case sets or changes the connection assignment therefor so that the lines with the maximum load are alternately connected to a first, second and third supply line of the three supply lines according to the current sequence. In the case of the AC charging terminals with single-phase current consumption, the only line is thus also the line with the maximum load at the same time. This is then alternately connected or electrically connected to the first, second and third supply line from one to the next AC charging terminal.

In the case of the AC terminals with two-phase current consumption, there are thus two current-carrying lines, and theoretically they can also be loaded equally. One of these two lines can then be selected as desired, for example the first of the two lines. In the actual implementation, however, it will be the case that two identical currents are never measured and therefore one of the two lines will be identified as the line with the maximum load, no matter how small the lead over the other line.

If this line, with the maximum load, of each AC charging terminal with two-phase current consumption is assigned to the first, second or third supply line, that is to say connected to it or electrically connected to it, it is proposed to connect the remaining second current-carrying line to the following supply line. For this purpose, the previously selected counting of the first, second and third supply line is used as a basis and accordingly the second supply line follows the first, the third supply line follows the second and the first supply line follows the third. Accordingly, the second current-carrying line is thus connected to, or electrically connected to, the second, third or first supply line.

This creates a clear specification and structure of action, according to which the lines with the maximum load and then subsequently the second current-carrying lines, if present, are connected to the respective supply lines. A complex optimization algorithm is not required for this.

If AC charging terminals (6) with three-phase current consumption are also included, it is proposed in particular that one of the remaining lines is connected to the following supply line, namely the second, third or first supply line (22, 23, 21). There is then only one free supply line left for the remaining third line.

An improvement or refinement can be achieved by virtue of first sorting the AC charging terminals into a first and second group, namely the AC charging terminals with single-phase current consumption into a first group and the AC charging terminals with two-phase current consumption into a second group and optionally the AC charging terminals (6) with three-phase current consumption into a third group. The above-described division according to the maximum phase current and also the proposed sequence of connection to the relevant supply lines are then carried out in groups. This also means that in the first group, essentially the line with the maximum load is the only current-carrying line in each case.

According to a particular option, the following connection sequence is proposed for the lines with the maximum load. This can be done both for all AC charging terminals with single-phase or two-phase or even three-phase current consumption or in groups for the first and second and, if applicable, third group, respectively.

Accordingly, it is proposed that the first line with the maximum load, that is to say the line, with the maximum load, of the first AC terminal according to the sorting, is connected to the first supply line, the second line with the maximum load to the second supply line and the third line with the maximum load to the third supply line. In this case, the first line with the maximum load, that is to say the line, with the maximum load, of the first AC terminal according to the sorting, is the second line with the maximum load the line with the maximum load of the second AC terminal, and so on.

For the fourth to sixth, however, a reverse sequence is then proposed, so that namely the fourth line with the maximum load is also connected to the third supply line, the fifth line with the maximum load is connected to the second supply line and the sixth line with the maximum load is connected to the first supply line. The first and sixth line with the maximum load are then thus connected to the first supply line.

This reversal of the sequence for the fourth to sixth prevents the first supply line from being loaded to a greater extent than the other two supply lines. This risk would exist namely if the first supply line were connected to the line with the maximum load and the fourth line with the maximum load. In addition, it is proposed that this principle also be proposed for the other lines, that is to say in particular to connect the seventh to ninth line with the maximum load to the first to third and to reconnect the tenth to twelfth line with the maximum load to the third to first supply line in reverse order, and so on.

According to one embodiment, it is proposed that sorting is generally carried out with the reverse sequence, that is to say starting with the last line with the maximum load and then continuing with the penultimate line with the maximum load, and so on until finally the first line with the maximum load. In this way it is possible to achieve a situation in which, in the first re-sorting steps, no excessive changes in the current are made. Starting with the line that carries the greatest current could, in the worst case, lead to a temporary great increase in the imbalance. However, if you start with the smallest currents, the lines with the largest currents are first swapped when balancing has already been partially achieved.

In particular, sorting with the reverse sequence is proposed so that the last line with the maximum load is taken as the start and this is connected to the first supply line, the penultimate line with the maximum load is connected to the second supply line, and the third from the last line with the maximum load is connected to the third supply line. Then the sequence is reversed again, so that the fourth from the last line with the maximum load is also connected to the third supply line, the fifth from the last is connected to the second and the sixth from the last is connected to the first. The balancing control system is particularly prepared to carry out all of the described functionalities by virtue of it having a corresponding control program that can be implemented, for example, on a process computer that can form part of the balancing control system. Furthermore, data channels, in particular data lines, are provided in order to connect the balancing control system to the AC charging terminals, in particular in order to be able to control the respective phase-change device. This can also be used to transfer sensor data from current measurements to the balancing control system.

Corresponding current sensors can be provided at the AC charging terminals for such sensor data and that can also mean that such current sensors are provided at the phase-change devices or the connection lines. It is also possible that each AC charging terminal itself has current sensors and transmits the corresponding data to the balancing control system via corresponding data channels, such as data lines, for example. The balancing control system can also be connected to an active rectifier via data and/or control channels in order to at least partially carry out balancing via same.

According to one configuration, it is proposed that
- the balancing control system is prepared to sort all connection lines according to their current consumption in a line sequence, regardless of the respective AC charging terminal,
- the phase-change devices each adjusts or changes the connection assignment so that all connection lines are alternately connected to the first, second and third supply lines of the three supply lines according to their line sequence, and then in particular the next three connection lines to the third, second and first supply line, wherein
- a check is carried out as a boundary condition to ensure that no two or three connection lines are connected to the same supply line for any AC charging terminal.

In this configuration, no distinction is thus initially made between single-phase, two-phase and three-phase AC terminals. All connection lines are sorted into a line sequence according to their current consumption. For example, in the line sequence, a first connection line of a first single-phase AC charging terminal could be at position 1, the third connection line of a second three-phase AC charging terminal could be at position 2 and its second connection line could be at position 5. The first and second connection lines of a third two-phase AC charging terminal could then be located at positions 3 and 4, for example. Then the first connection line of the first AC charging terminal (position 1) would be connected to the first supply line, the third connection line of the second three-phase AC charging terminal (position 2) would be connected to the second supply line and the first connection line of the third two-phase AC charging terminal (position 3) would be connected to the third supply line.

The next three connection lines would then be connected to the third, second and first supply line, that is to say first the second connection line of the third two-phase AC charging terminal (position 4) would be connected to the third supply line and the second connection line of the second three-phase AC charging terminal (position 5) would be connected to the second supply line, as well as a further connection line, not mentioned in the above example, (position 6) to the first supply line. In this case, however, from the second three-phase AC charging terminal two connection lines would be connected to the second supply line, and from the third two-phase AC charging terminal two connection lines would be connected to the third supply line.

This should not be the case and that is why it is checked as a boundary condition. In the present case, the assignment of the second connection line of the third two-phase AC charging terminal (position 4) to the third supply line would not be permitted, and instead it would be connected to the next supply line, provided that the boundary condition permits this. The second connection line of the second three-phase AC charging terminal (position 5) could then take over the position and be connected to the first supply line if the check of the boundary condition permits this.

According to one embodiment, it is proposed that the balancing control system is prepared so that a connection assignment is determined via an optimization calculation based on the current consumptions of the connection lines of all AC charging terminals in order to minimize the phase imbalance. This is proposed at least for AC charging terminals with single-phase or two-phase current consumption, namely if it can be particularly assumed that AC charging terminals with three-phase current consumption also have current consumption that is essentially equally distributed over all three phases. If, however, it turns out that AC charging terminals with three-phase current consumption operate unevenly in relation to the three phases, in particular very unevenly, then provision can be made for AC charging terminals with three-phase current consumption to also be included in the optimization calculation.

An optimization calculation can, for example, be carried out in such a way that a vector with three elements is provided for each AC charging terminal, in which vector the current values of the three phases are located. The optimization calculation can then, for example, successively swap the values of each vector, possibly except for the first one, and each time form a sum of all vectors and check to determine in which case the three elements of the resulting sum vector have the smallest deviations from one another.

Another possibility is to calculate an ideal current value for all three phases of the power supply and to swap the elements in each of the individual vectors mentioned in order to achieve this ideal value. This ideal value can easily be calculated by adding up all the current values of the three phases of all AC charging terminals and dividing them by three.

Another possibility is in each case to split the three connection lines of each AC charging terminal into positive and negative phase-sequence system components and then only consider the negative phase-sequence system component for optimization, in particular in such a way that the phase positions of the negative phase-sequence system currents are switched further so that the sum of all negative phase-sequence system components in the optimization calculation results in zero or at least becomes minimal.

For the optimization calculation, it is optionally proposed that the number of necessary switchover processes of the phase-change device be taken into account. It may be the case, for example, that an imbalance of 40%, for example, can be reduced to 3% with few switchover operations, but a very large number of switchovers is required in order to achieve a further reduction to 2%. In particular, one secondary condition that can be taken into account is to minimize the number of switchover processes. Using as few switchover processes as possible can therefore be included as a secondary condition.

According to one embodiment, it is proposed that at least one DC charging terminal with an upstream active rectifier is provided, the active rectifier is connected to the power supply, and the active rectifier is prepared to load the three supply lines differently, to reduce an imbalance of the currents in the power supply. The DC charging terminal is thus prepared to provide at least one direct current for charging an electric vehicle. For this purpose, the DC charging terminal, which can also be referred to as a direct current charging terminal, can have several DC sub-terminals, which can also be referred to as DC chargers or direct current chargers. An electric vehicle can be connected here for charging without the electric vehicle itself having to have its own charging current control system.

The active rectifier is therefore provided to generate a first direct current, which may be further processed in the sub-terminals, and said rectifier can not only adjust the direct current to the desired level, but it can also be controlled on the AC side and to that extent control its three-phase input current, specifically also with regard to each individual phase. Such an active rectifier can for this purpose also be constructed in the manner of an inverter, whereas it is operated in the opposite direction, namely from alternating current to direct current. In fact, it is also possible here that such a rectifier/inverter is operated bidirectionally. In that case, the DC charging terminal could also feed electrical power into the power supply, which is proposed as a preferred configuration.

This active rectifier can thus control the load on the three supply lines and the active rectifier is preferably controlled in such a way that it generates a negative phase-sequence system current as far as possible with any phase and amplitude and thus connects to the three-phase power supply, thereby reducing an imbalance of the currents in the power supply.

The generation of such a negative phase-sequence system current refers to the method of balanced components, according to which a three-phase current is computationally broken down into a positive phase-sequence system or a positive phase-sequence system component and a negative phase-sequence system or a negative phase-sequence system component, which can also be referred to as negative phase-sequence system current, by means of a transformation. Basically, a zero phase-sequence system or zero phase-sequence system current must also be taken into account, which can be disregarded here. A zero phase-sequence system current can indeed occur here, but it is assumed that there is essentially a de facto ohmic load from all the electric vehicles to be charged and thus a reduction in the imbalance and thus a reduction in a negative phase-sequence system current component almost automatically leads to a reduction in the zero phase-sequence system current. It is therefore sufficient to consider the imbalance. Nevertheless, provision can preferably be made for a zero phase-sequence system component to be taken into account and compensated.

In any case, it is proposed in this respect, in order to reduce the imbalance, to specify a negative phase-sequence system current and to draw it from the power supply together with a positive phase-sequence system current required for charging the electric vehicles connected to the DC charging terminal.

From the calculated negative phase-sequence system current and the required positive phase-sequence system current, the actual three currents of the three phases can be calculated for this purpose and the active rectifier can be controlled in such a way that it draws these three currents from the power supply. The active rectifier thus connects the negative phase-sequence system current to the three-phase power supply.

Provision is preferably made for the balancing control system to be prepared to control the active rectifier in order to reduce the imbalance of the currents. This can mean in particular that, on the one hand, the balancing control system receives sensor data about the three-phase power supply, possibly including information about a current of a neutral conductor of the power supply. It is also proposed that the balancing control system has a data connection, in particular a data line, by way of which the active rectifier can be controlled. Preferably, at least one setpoint value for a negative phase-sequence system current to be connected from the active rectifier to the three-phase power supply, which the balancing control system has calculated beforehand, is transmitted via this. It is particularly advantageous here if the balancing control system can control both this active rectifier and the phase-change devices. Otherwise, several DC charging terminals and several active rectifiers can of course also be provided.

According to one configuration, the charging station is prepared to repeat the changing of the connection assignment after an imbalance threshold value is exceeded, which is a measure of an imbalance of the power supply, or to repeat same in a recurring cycle, wherein in particular the recurring cycle is repeatedly run through continuously after a repetition time, wherein the repetition time is shorter than an average charging process of an electric vehicle. Accordingly, it is thus proposed to check the connection assignment even during a charging process and to change it if necessary. It has been particularly recognized here that the load on the three-phase power supply can also change during a charging process. In particular, it has been recognized that, when charging electric vehicles, high charging currents often occur at the beginning, which then gradually reduce. In addition, the load situation of the power supply can also constantly change due to the fact that a vehicle leaves the charging station and/or a vehicle is newly connected to the charging station.

The repetition time is selected in particular in a range from 1 min to 5 min. This is well below the duration of an average charging process for an electric vehicle, which can range from 15 minutes to several hours. It is therefore proposed that the connection assignment be checked and, if necessary, changed significantly more often.

The power supply is preferably continuously monitored; in particular, the currents of the three supply lines are continuously monitored, while the imbalance is also monitored. If the imbalance becomes too large, balancing is repeated. This can be done by specifying an imbalance threshold value.

The power supply is preferably connected to a grid connection point of an electrical supply grid, in particular via a transformer. It is thus possible to achieve a situation in which balancing the three phases of the power supply also has a correspondingly positive effect on the electrical supply grid. As a result, the current quality in the grid can be improved by means of the charging station, at least in comparison to the situation when no attention is paid to reducing an imbalance of the three-phase power supply in the charging station.

A method for charging electric vehicles by means of a charging station is also proposed. This method is based on a charging station that has several AC charging terminals, each of which is designed to charge an electric vehicle by means of alternating current. According to the method, each of the AC charging terminals is supplied with three-phase electric current via a phase-change device, which is connected to a three-phase power supply of the charging station. This can also mean that the corresponding three phases are applied to an input of the AC charging terminal, but are only partially retrieved. Of course, current only flows when an electric vehicle is connected.

Three voltage phases are then provided by the power supply, which has three supply lines. Each of the three supply lines thus has one of the three voltage phases.

In addition, each AC charging terminal has three connection lines, each of which is connected to the three supply lines, and the three voltage phases are applied to the connection lines via the three supply lines. Each phase-change device then changes a connection assignment between the three supply lines and the three connection lines to reduce a current imbalance in the power supply. If a current imbalance has become minimal, in particular zero, then of course the connection assignment does not need to be changed. But whenever the current imbalance is to be reduced, this phase-change device can change the connection assignment. This is thus accordingly performed for each AC charging terminal individually.

It is preferably proposed that the method uses a charging station as explained in accordance with an embodiment described above. In particular, it is proposed that the method or a part thereof is implemented in the balancing control system of the charging station.

BRIEF DESCRIPTION OF THE SEVERAL VIEWS OF THE DRAWINGS

The invention is explained in more detail below by way of example on the basis of embodiments with reference to the accompanying figures.

DETAILED DESCRIPTION

Figure 1:
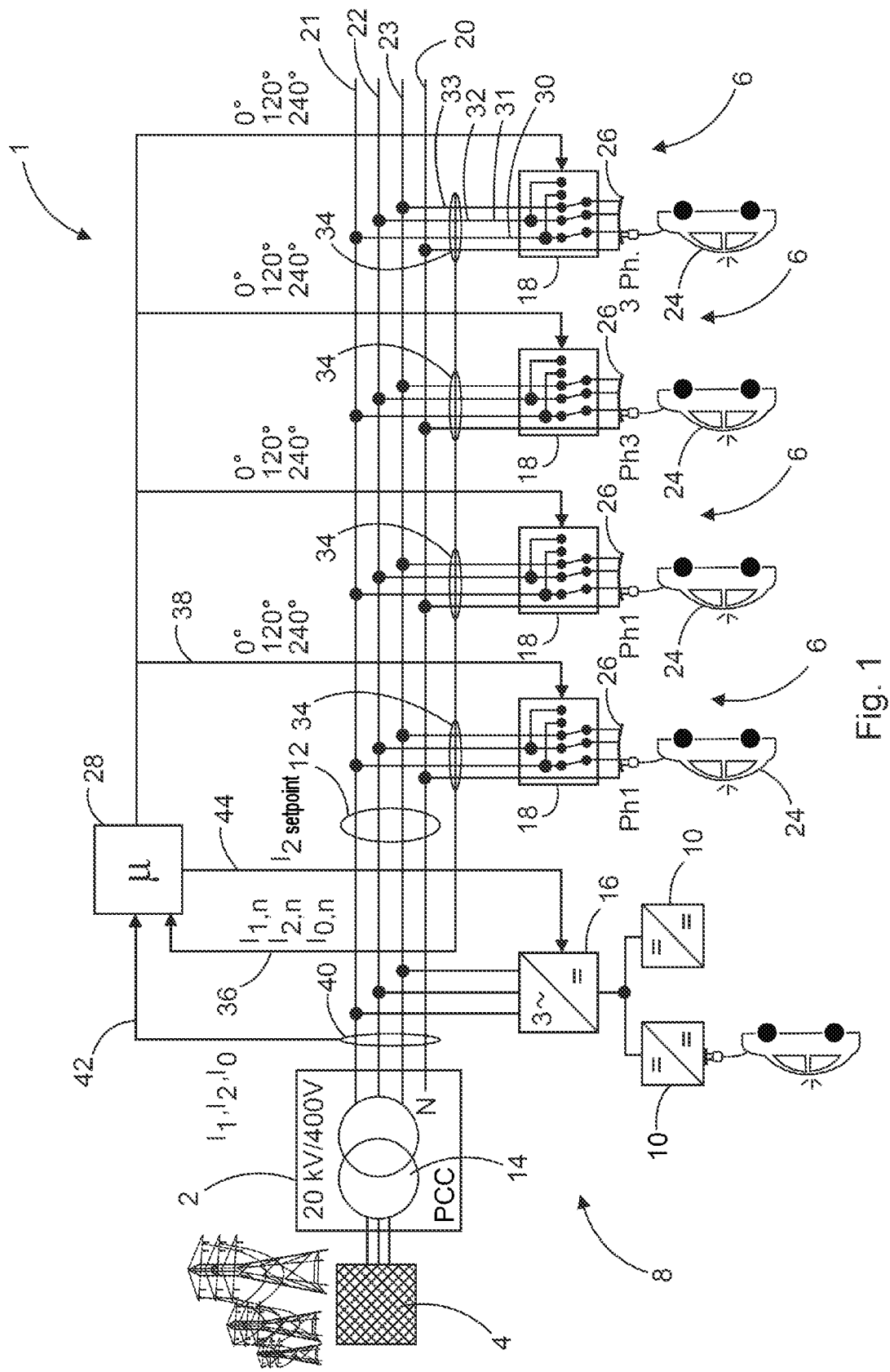
FIG. 1 shows a schematic illustration of a charging station.

FIG. 1 schematically shows a charging station 1 that is connected to an electrical supply grid 4 via a grid connection point 2. The charging station 1 in this case has a plurality of AC charging terminals 6 and a DC charging terminal 8 with two sub-charging terminals, namely with two DC chargers 10.

To supply the AC charging terminals 6 and the DC charging terminal 8, a power supply 12 is provided, which has a first, second and third supply line 21, 22 and 23, respectively, and a supply neutral conductor 20. The power supply 12 is connected here to the grid connection point 2 and there to a transformer 14 provided at the grid connection point 2.

The DC charging terminal 8 is connected to the three lines 21, 22 and 23 of the power supply 12 via an active rectifier 16. A connection to the supply neutral conductor 20 is not provided for the active rectifier, but can be provided according to one embodiment.

Each AC charging terminal 6 is connected to the power supply 12 via a respective phase-change device 18. The connection is made here both to the three supply lines 21, 22 and 23 as well as to the supply neutral conductor.

Each AC charging terminal 6 is connected to the first, second and third supply line 21, 22 and 23, respectively, via a first, second and third connection line 31, 32 and 33, respectively. For the sake of better clarity, the reference signs are only drawn in for one AC charging terminal 6, but apply equally to the other AC charging terminals 6, which have the identical structure and identical connection in FIG. 1. Each AC charging terminal 6 is also connected to the supply neutral conductor 20 via a neutral conductor connection 30. Each AC charging terminal 6 also has a three-phase output connection 26 to which the respective electric vehicle 24 to be charged can be connected.

The three-phase output connection 26 can have its connection assignment to the three connection lines 31, 32 and 33 changed by the phase-change device 18. For this purpose, FIG. 1 shows the same setting for each of the four phase-change devices 18 shown. The phase-change device 18 is shown here as a coupled triple switch, which can thus change the connection assignment for all three phases at the same time and in this respect, in the electrical engineering sense, can achieve a phase rotation of 120° or 240° for the three-phase system. This is indicated in FIG. 1 by virtue of, in addition to the symbols above the power supply 12 for each AC charging terminal 6, 0°, 120° or 240° being written. In this respect, the phase-change devices 18 shown can also be referred to as phase rotation devices or respectively as phase rotation switches. However, other ways of implementing the changing of the connection assignment are also considered.

Incidentally, the connection neutral conductor 30 is in each case only looped through the phase-change device 18 and is not affected by switchover processes.

In FIG. 1, four AC charging terminals 6 are shown by way of example, but further AC charging terminals can also be provided and the power supply 12 also indicates that it can be continued even further. Two of the four AC charging terminals 6 each have an electric vehicle connected to a single-phase in-vehicle charger, with the first phase here specifically only being loaded, which is indicated by Ph1. An electric vehicle 24 is connected to a further AC charging terminal, said vehicle also using an in-vehicle charger, which is single-phase, but which is connected to a third phase, which is indicated by Ph3. An in-vehicle charger is also referred to in specialist circles as an on-board charger, which can therefore be used as a synonymous term. Finally, a fourth electric vehicle 24 is provided, which uses a three-phase in-vehicle charger.

For the situation of the four AC charging terminals 6 shown as an example in FIG. 1, the situation thus arises that the first phase is loaded by two single-phase in-vehicle chargers, the second phase is not loaded by any in-vehicle chargers and the third phase is loaded by a single-phase in-vehicle charger. In addition, all three phases are ideally loaded equally by the three-phase in-vehicle charger. Accordingly, the first phase is likely to be heavily overloaded and the second phase is likely to be heavily underloaded, with the result that overall there is a very imbalanced load on the power supply 12.

In this illustrated example, this could easily be remedied by virtue of the phase-change device 18 carrying out a phase switchover or phase advancement for one of the two AC charging terminals that are loaded on the first phase, with the result that the first phase that the single-phase in-vehicle charger uses is switched to the second connection line, which then results in an interconnection with the second supply line. As a result, a single-phase in-vehicle charger would then be interconnected in each case with the first, second and third supply line.

A balancing control system (e.g, controller, processor or computer) 28 is provided for operating the charging station and in particular for controlling the phase-change devices 18 in order to reduce or, if possible, minimize an imbalanced load on the three-phase power supply. This balancing control system 28 receives information about all currents or connection lines of the AC charging terminals 6. A terminal sensor (e.g., ammeter) 34 is provided in each case for this purpose. The terminal sensor 34 thus supplies information about each current between each AC charging terminal and the power supply 12. For this purpose, for each AC charging terminal 6, four respective current values can be transmitted to the balancing control system 28 for each of the four currents, that is to say the three phase currents and the neutral conductor current.

However, it is also possible that the respective terminal sensor 34 or an evaluation unit (e.g., controller, processor or computer) coupled to it already converts these four currents using the balanced component method, namely into a positive phase-sequence system current $I_{1,n}$, a negative phase-sequence system current $I_{2,n}$ and a zero phase-sequence system current $I_{0,n}$. These currents can be transmitted to the balancing control system 28 via a terminal sensor line 36, and this is indicated in FIG. 1 on the terminal sensor line 36. The index n for each of these partial currents indicates that such three currents are recorded for each of the AC charging terminals 6. The index n therefore stands for the respective number of the AC charging terminal. In the present illustrative case of FIG. 1, the index n would thus range from 1 to 4.

The balancing control system 28 can now determine an optimization based on these current values that it has received via the terminal sensor line 36 and then control the phase-change devices 18 accordingly in order to implement the connection assignments between the respective output connection 26 and the connection lines 31, 32 and 33 of the AC charging terminal 6 by switching the phase-change devices 18 accordingly. For this purpose, corresponding control signals can be transmitted from the balancing control system 28 to the phase-change devices 18, and for this purpose, for example, a terminal control line 38 can be provided to each phase-change device 18.

FIG. 1 additionally illustrates the use of the active rectifier 16 to further reduce any imbalance of the currents in the power supply 12. To this end, it is first proposed that the balancing control system 28 receives corresponding current data from the power supply 12. A power supply sensor 40 is provided for this, which can detect all four currents of the power supply 12. This power supply sensor or an assigned evaluation unit can also provide a transformation according to the balanced component method and accordingly determine a positive phase-sequence system current $I_1$, a negative phase-sequence system current $I_2$ and a zero phase-sequence system current $I_0$ and feed same to the balancing control system 28 via a feed sensor line 42. From this, naturally taking into account the recorded currents of the AC charging terminals 6, the balancing control system 28 can generate, as a setpoint value, a negative phase-sequence system current component $I_{2\ setpoint}$ to be specified and feed it to the active rectifier 16 via a rectifier control line 44.

Together with the current requirement of the DC charging terminal 8 and the setpoint value for the negative phase-sequence system current $I_{2\ setpoint}$ the active rectifier 16 can then be controlled in such a way that, after reverse transformation from the representation according to the balanced components, a corresponding three-phase current is drawn from the power supply 12. The active rectifier 16 and thus the DC charging terminal 8 are thus supplied from the power supply 12, that is to say draws current, but at the same time connects the negative phase-sequence system current that has been specified by the balancing control system 28. A further equalization of the currents in the power supply 12 can thus be achieved.

Figure 2:
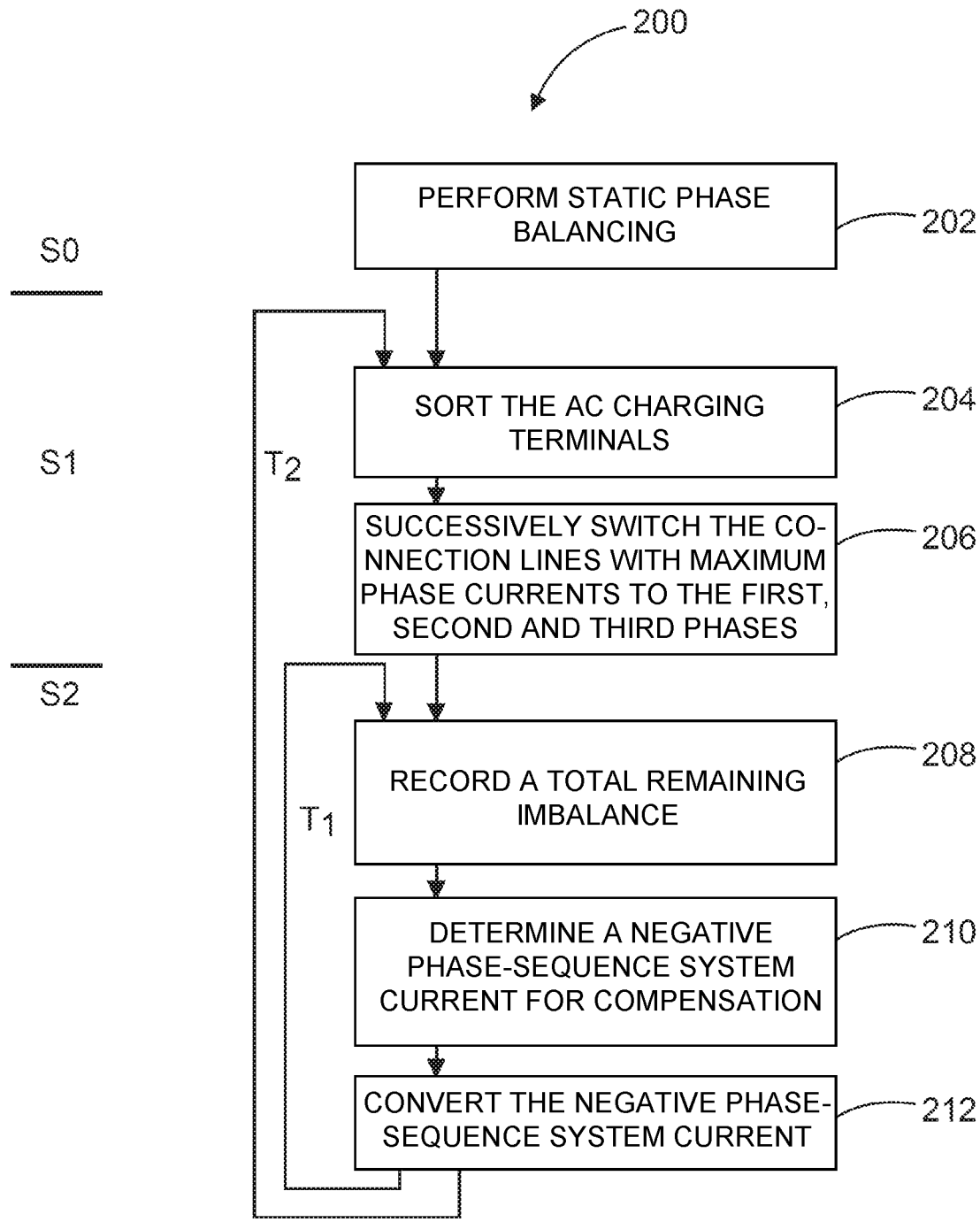
FIG. 2 shows a flowchart for a method for charging electric vehicles.

FIG. 2 shows a flowchart 200 for minimizing the imbalance in a power supply 12 from FIG. 1. First, in a step 0, which is indicated as S0 in FIG. 2, static phase balancing is carried out. This is indicated by the static balancing block 202. Accordingly, the phase-change device for all AC charging terminals that are not used at the moment is successively shifted from one to the next AC charging terminal by one phase in order to achieve equalization in this respect. For the example in FIG. 1, assuming that none of the four AC charging terminals 6 shown is being used at the moment, this could mean that, according to the illustration in FIG. 1 starting from the left, the first phase-change device 18 remains as it is, the next phase-change device 18 is switched by one switching position further to the right, the third is switched by two positions further to the right and the fourth remains as it is. If there were a fifth, it would be switched by one position further again, the sixth by two, and so on.

This creates a good basis that an approximately even distribution of the phases can be achieved as a starting condition, at least when connecting single-phase in-vehicle chargers. If vehicles are already connected to AC charging terminals for charging, the proposed static phase balancing is only proposed for the AC charging terminals that have not been used up to that point. As soon as vehicles are connected, there is initially very good balancing as a starting condition. However, these connected vehicles or the corresponding AC charging terminals can then be included in a further minimization of the imbalance, as is carried out in the following steps.

Correspondingly, in order to specifically minimize the imbalance, step 1 is then proposed next, which is identified as S1 in FIG. 2 and comprises several blocks. First of all, the AC charging terminals are sorted namely in the sorting block 204 according to the size of the respective maximum phase current of this AC charging terminal. Different variants come into consideration here. One variant is that only those AC charging terminals that have a single-phase or two-phase current consumption at the moment are taken into account in this sorting. In accordance with the embodiment according to FIG. 1, this can also be recognized by the terminal sensor 34 in each case.

Another variant is that the AC charging terminals are sorted in groups according to the size of the maximum phase currents. Accordingly, a first group can include all AC charging terminals that show a single-phase current load and a second group can include all AC charging terminals that show a two-phase current load. If necessary, the AC charging terminals that show a three-phase current load can also be sorted into a third group.

The minimization of the imbalance is continued in the variation block 206 by way of this sorting, be it in groups or otherwise. In the variation block 206, the connection lines with the maximum phase currents are then successively switched to the first, second and third phases in the order that resulted from the sorting block 204. This is particularly to be understood in such a way that for the AC charging terminal with the greatest maximum phase current this is switched to the first phase, for the AC charging terminal with the second greatest maximum current this is switched to the second phase and for the AC charging terminal with the third greatest maximum phase current this is switched to the third phase.

In the case of the AC charging terminal with the fourth greatest maximum phase current, however, it does not start from the beginning, but rather back in the same order. The AC charging terminal with the fourth greatest maximum phase current is also switched to the third phase, the fifth greatest maximum phase current is switched to the second phase and the sixth greatest maximum phase current to the first.

All of this, that is to say especially the process in the sorting block 204 and in the variation block 206, is proposed for AC charging terminals such as the AC charging terminals 6 and implemented accordingly using the phase-change devices such as the phase-change devices 18 of FIG. 1.

In step 2, which is identified as S2 in FIG. 2, a further minimization of the imbalance is proposed, which ideally leads to the currents in the power supply, such as the power supply 12 of FIG. 1, becoming completely balanced; the imbalance is at least very greatly minimized, in particular is close to zero.

One or optionally more active rectifiers, such as the active rectifier 16 of the embodiment in FIG. 1, are now used for this purpose. For this purpose, the total imbalance remaining in spite of the measures according to the variation block 206 is recorded in the residual imbalance determination block 208. This can be achieved, particularly with reference to the embodiment of FIG. 1, by the power supply sensor 40, which transmits its detected result to the balancing control system 28. A negative phase-sequence system current required for compensation can then be determined from this. This can be carried out in the negative phase-sequence system determination block 210. The result would be a negative phase-sequence system current, such as the negative phase-sequence system current $I_{2\ setpoint}$ of FIG. 1, which is given to the active rectifier 16 as a setpoint value. Correspondingly, this conversion takes place in the rectifier control block 212, which converts this specification of the negative phase-sequence system current and thus actually switches the negative phase-sequence system current to the power supply 12, that is to say to the three currents present there or the three-phase current system present there.

In the ideal case, a balanced three-phase current system can be achieved in the power supply 12 as a result.

It should be noted here that charging processes for electric vehicles usually do not take a long-term stationary and unchanged course, but rather that the charging current in particular decreases over time. Especially at the beginning of a charging process, the initial charging current can drop significantly, for example from 100% to 30% or even less. At the least the charging process can slow down toward the end, when the state of charge is 80%. With this change, the imbalance can thus also change. In particular, it can increase or occur again after the minimization of the imbalance according to the sequence of FIG. 2 has been successful. It is therefore proposed to repeat step 2 frequently, that is to say the implementations in the residual imbalance determination block 208, the negative phase-sequence system determination block 210 and the rectifier control block 212. Activation of certain loads such as devices for cooling, heating, predictive air conditioning during or at the end of the charging process can also influence the current consumption.

This is indicated in FIG. 2 by a return in the area of step S2. This repetition can be repeated at a first repetition time $T_1$. This first repetition time $T_1$ can be chosen to be very small, for example in the range of 1 min or it can be chosen to be 10 s or less. In fact, all of these executions in blocks 208, 210 and 212 can be implemented in a automated/computerized manner and can therefore be repeated quickly. It is therefore even possible that the executions of blocks 208, 210 and 212 are repeated essentially continuously or quasi-continuously, namely in accordance with a computer clock rate.

However, it has also been recognized that this final minimization of the imbalance by means of the controlled rectifier can only compensate for a residual imbalance. It is therefore proposed that the reduction of the imbalance according to the implementations of the sorting block 204 and the variation block 206 should also be repeated regularly, namely in accordance with a second repetition time $T_2$. This second repetition time can be 1 minute or more, for example. It is also possible that it is several minutes and is, for example, 3 minutes or is selected to be more. It should preferably be selected to be less than 10 minutes.

In this way, it is then possible to achieve a situation in which basically rough or strong unequal loads, as can be expected from many single-phase or two-phase in-vehicle chargers, are initially reduced or equalized via the phase-change devices, such as the phase-change devices 18, and only a remaining residual imbalance is further reduced or even eliminated by the active rectifier.

Two more specific examples of possible imbalances with the various proposed solutions are given below.

It should be noted that the two examples in the "Balanced components" tables are based on a representation and consideration in accordance with the balanced component method. In these tables, $I_1$ denotes the positive phase-sequence system current, $I_2$ the negative phase-sequence system current and $I_0$ the zero phase-sequence system current. The imbalance $I_{imbal}$ is calculated using the following formula:

$$I_{imbal} = \frac{I_2 + I_0}{I_1} \cdot 100\%$$

The current values of both examples are normalized to a reference value.

Example 1

Charging process with 1 p.u. DC (balanced AC load) and 0.33 p.u. AC to phase A (total current):

| | Phase Values | | | Balanced Components | |
| --- | --- | --- | --- | --- | --- |
| | Amplitude | Angle | | Amplitude | Angle |
| Ia | 2 | 0 | I0 | 0.33 | 0.00 |
| Ib | 1 | −120 | I1 | 1.33 | 0.00 |
| Ic | 1 | 120 | I2 | 0.33 | 0.00 |

This results in the imbalance:

$$I_{imbal} = \frac{I_2 + I_0}{I_1} = 50\%$$

Feeding in an additional negative phase-sequence system current by way of the DC charger:

| | Phase Values | | | Balanced Components | |
| --- | --- | --- | --- | --- | --- |
| | Amplitude | Angle | | Amplitude | Angle |
| Ia | 0.67 | 0 | I0 | 0.00 | 0.00 |
| Ib | 1.2 | −106.2 | I1 | 1.00 | 0.00 |
| Ic | 1.2 | 106.2 | I2 | 0.33 | 180.00 |

Total current after compensation of the negative phase-sequence system:

| | Phase Values | | | Balanced Components | |
| --- | --- | --- | --- | --- | --- |
| | Amplitude | Angle | | Amplitude | Angle |
| Ia | 1.67 | 0 | I0 | 0.33 | 0.00 |
| Ib | 1.2 | −106.2 | I1 | 1.33 | 0.00 |
| Ic | 1.2 | 106.2 | I2 | 0.00 | 0.00 |

This results in the imbalance:

$$I_{imbal} = \frac{I_2 + I_0}{I_1} = 25\%$$

In example 1, an imbalance of 50% has thus been reduced to 25% by feeding in a negative phase-sequence system current, for example by way of the active rectifier 16 of the embodiment of FIG. 1.

Example 2

Charging process with 1 p.u. DC (balanced AC load) and 4×0.33 p.u. AC to phase A (total current):

| | Phase Values | | | Balanced Components | |
| --- | --- | --- | --- | --- | --- |
| | Amplitude | Angle | | Amplitude | Angle |
| Ia | 5 | 0 | I0 | 1.33 | 0.00 |
| Ib | 1 | −120 | I1 | 2.33 | 0.00 |
| Ic | 1 | 120 | I2 | 1.33 | 0.00 |

This results in the imbalance:

$$I_{imbal} = \frac{I_2 + I_0}{I_1} = 114\%$$

Phase rotation of AC charging point four by 240° and AC charging point 3 by 120°:

| | Phase Values | | | Balanced Components | |
|---|---|---|---|---|---|
| | Amplitude | Angle | | Amplitude | Angle |
| Ia | 3 | 0 | I0 | 0.33 | 0.00 |
| Ib | 2 | −120 | I1 | 2.33 | 0.00 |
| Ic | 2 | 120 | I2 | 0.33 | 0.00 |

This results in the imbalance:

$$I_{imbal} = \frac{I_2 + I_0}{I_1} = 28\%$$

Total current after compensation of the negative phase-sequence system:

| | Phase Values | | | Balanced Components | |
|---|---|---|---|---|---|
| | Amplitude | Angle | | Amplitude | Angle |
| Ia | 2.66 | 0 | I0 | 0.33 | 0.00 |
| Ib | 2.18 | −112.5 | I1 | 2.33 | 0.00 |
| Ic | 2.18 | 112.5 | I2 | 0.00 | 0.00 |

This results in the imbalance:

$$I_{imbal} = \frac{I_2 + I_0}{I_1} = 14\%$$

In the 2nd example, there was initially an even greater total imbalance, namely 114%. In a first step, which could correspond to step S1 in FIG. 2, it was reduced to 28% by changing some phase assignments. For this purpose, a phase rotation of 240° was carried out on a fourth AC charging terminal, which could correspond to the AC charging terminal 6 shown on the far right in FIG. 1. The connection lines were thus switched further by two counters, in relation to FIG. 1 that is the first connection line 31 to the third supply line 23, and 32 to 21 and 33 to 22.

Furthermore, a phase rotation of 120° was carried out on a third AC charging terminal, which could correspond to the AC charging terminal 6 shown second last on the right in FIG. 1. The connection lines were thus switched further there by a counter, in relation to FIG. 1 that is the first connection line 31 to the second supply line 22, and 32 to 23 and 33 to 21.

In a second step, which can correspond to step S2 in FIG. 2, the imbalance could be further reduced to 14% by feeding in a negative phase-sequence system current, for example by way of the active rectifier 16 of the embodiment of FIG. 1.

The invention claimed is:

1. A charging station for charging electric vehicles, comprising:
 a plurality of alternating current (AC) charging terminals, each AC charging terminal of the plurality of AC charging terminals being configured to charge an electric vehicle using an alternating current, and each AC charging terminal of the plurality of AC charging terminals being coupled to a three-phase power supply via a phase-change switch of a plurality of phase-change switches for supplying the AC charging terminal with three-phase electric current, wherein:
  the three-phase power supply has three supply lines for respectively providing three voltage phases,
  each AC charging terminal of the plurality of AC charging terminals has three connection lines for respectively coupling the AC charging terminal to the three supply lines and for respectively applying the three voltage phases to the three connection lines, and
  each phase-change switch of the plurality of phase-change switches is configured to change a connection assignment between the three supply lines and the three connection lines; and
 a controller configured to:
  sort the plurality of AC charging terminals according to present current consumption of the plurality of AC charging terminals; and
  control the plurality of phase-change switches depending on an order of the sorting of the plurality of AC charging terminals according to the present current consumption of the plurality of AC charging terminals, to minimize a phase imbalance of the three supply lines.

2. The charging station as claimed in claim 1, wherein the controller is configured to:
 sort the plurality of AC charging terminals according to whether the plurality of AC charging terminals operate in a single-phase, two-phase or three-phase manner; and
 control the plurality of phase-change switches depending on an order of the sorting of the plurality of AC charging terminals according to whether the plurality of AC charging terminals operate in the single-phase, two-phase or three-phase manner, to minimize the phase imbalance of the three supply lines.

3. The charging station as claimed in claim 2, wherein the controller is configured to:
 sort AC charging terminals having single-phase or two-phase current consumption according to the present current consumption; or
 sort the plurality of AC charging terminals according to whether the plurality of AC charging terminals operate in the single-phase, two-phase or three-phase manner by sorting the AC charging terminals having the single-phase current consumption into a first group, sorting the AC charging terminals having the with two-phase current consumption into a second group and sorting AC charging terminals having three-phase current consumption into a third group, and sort the plurality of AC charging terminals in groups according to the present current consumption.

4. The charging station as claimed in claim 3, wherein the controller is configured to:
 identify, for each AC charging terminal of the plurality of AC charging terminals, a connection line of the three connection lines having a largest current consumption;

designate the identified connection line as a connection line having a maximum load;
use the largest current consumption as a maximum phase current of the AC charging terminal; and
sort the plurality of AC charging terminals according to the respective maximum phase current in a current sequence.

5. The charging station as claimed in claim 4, wherein the phase-change switch is configured to change the connection assignment to couple the connection line having the maximum load alternately to first, second and third supply lines of the three supply lines according to the current sequence.

6. The charging station as claimed in claim 4, wherein the phase-change switch is configured to:
for the plurality of AC charging terminals having the two-phase current consumption, couple a second current-carrying line to a following second, third or first supply line of the three supply lines; or
for the plurality of AC charging terminals having the three-phase current consumption, couple one of remaining lines to a following second, third or first supply line of the three supply lines.

7. The charging station as claimed in claim 4, wherein the phase-change switch is configured to couple:
a first line having the maximum load to a first supply line of the three supply lines,
a second line having the maximum load to a second supply line of the three supply lines,
a third line having the maximum load to a third supply line of the three supply lines,
a fourth line having the maximum load to the third supply line of the three supply lines,
a fifth line having the maximum load to the second supply line of the three supply lines, and
a sixth line having the maximum load to the first supply line of the three supply lines.

8. The charging station as claimed in claim 1, wherein:
the controller is configured to sort connection lines of the plurality of AC charging terminals according to a respective current consumption of the connection lines in a line sequence and irrespective of an identity of an AC charging terminal associated with each connection line,
each phase-change switch of the plurality of phase-change switches is configured to change the connection assignment to respectively couple first three connection lines of the connection lines in the line sequence alternately to first, second and third supply lines of the three supply lines according to the line sequence, and respectively couple next three connection lines of the connection lines in the line sequence to the third, second and first supply lines of the three supply lines, and
the controller is configured to evaluate a boundary condition to prevent two or three connection lines of an AC charging terminal from being coupled to the same supply line.

9. The charging station as claimed in claim 1, wherein the controller is configured to determine the connection assignment using an optimization calculation based on current consumptions of the three connection lines of the plurality of AC charging terminals or of at least AC charging terminals having single-phase or two-phase current consumption, wherein the optimization calculation mitigates the phase imbalance.

10. The charging station as claimed in claim 9, wherein the controller is configured to determine the connection assignment using a secondary condition that reduces a number of switching operations of the plurality of phase-change switches.

11. The charging station as claimed in claim 1, comprising:
at least one DC charging terminal having an upstream active rectifier that is coupled to the three-phase power supply, and configured to load the three supply lines differently.

12. The charging station as claimed in claim 11, wherein the active rectifier is configured to couple a negative phase-sequence system current to the three-phase power supply to reduce an imbalance of currents in the three-phase power supply, and wherein the controller is configured to control the active rectifier to reduce the imbalance of the currents.

13. The charging station as claimed in claim 1, wherein the charging station is configured to repeat changing the connection assignment in response to an imbalance threshold value being exceeded, wherein the imbalance threshold value is representative of an imbalance of the three-phase power supply.

14. The charging station as claimed in claim 13, wherein the charging station is configured to:
repeat changing the connection assignment according to a recurring cycle, wherein:
the recurring cycle is repeatedly run after a repetition time that is selected to be shorter than an average charging process duration of an electric vehicle, and
the repetition time is between one minute and five minutes.

15. The charging station as claimed in claim 1, wherein the three-phase power supply is coupled to a grid connection point of an electrical supply grid via a transformer.

16. A method for charging electric vehicles using a charging station having a plurality of alternating current (AC) charging terminals, comprising:
supplying, each AC charging terminal of the plurality of AC charging terminals with three-phase electric current via a respective phase-change switch of a plurality of phase-change switches, wherein:
the phase-change switch is coupled to a three-phase power supply of the charging station,
the three-phase power supply has three supply lines;
providing, by the three-phase power supply, three voltage phases, wherein each AC charging terminal of the plurality of AC charging terminals has three connection lines that are coupled to the three supply lines and via which the three voltage phases are applied to the three connection lines;
sorting, by a controller, the plurality of AC charging terminals according to present current consumption of the plurality of AC charging terminals;
controlling, by the controller, the plurality of phase-change switches depending on an order of the sorting of the plurality of AC charging terminals according to the present current consumption of the plurality of AC charging terminals, to minimize a current imbalance of the three-phase power supply; and
changing, by each phase-change switch of the plurality of phase-change switches, a connection assignment between the three supply lines and the three connection lines of the respective AC charging terminal of the plurality of AC charging terminals to reduce the current imbalance of the three-phase power supply.

17. A charging station for charging electric vehicles, comprising:
- a plurality of alternating current (AC) charging terminals, each AC charging terminal of the plurality of AC charging terminals being configured to charge an electric vehicle using an alternating current, and each AC charging terminal of the plurality of AC charging terminals being coupled to a three-phase power supply via a phase-change switch of a plurality of phase-change switches for supplying the AC charging terminal with three-phase electric current, wherein:
  - the three-phase power supply has three supply lines for respectively providing three voltage phases,
  - each AC charging terminal of the plurality of AC charging terminals has three connection lines for respectively coupling the AC charging terminal to the three supply lines and for respectively applying the three voltage phases to the three connection lines, and
  - each phase-change switch of the plurality of phase-change switches is configured to change a connection assignment between the three supply lines and the three connection lines; and
- a controller configured to:
  - sort the plurality of AC charging terminals according to whether the plurality of AC charging terminals operate in a single-phase, two-phase or three-phase manner; and
  - control the plurality of phase-change switches depending on an order of the sorting of the plurality of AC charging terminals accordingly to whether the plurality of AC charging terminals operate in the single-phase, two-phase or three-phase manner, to minimize a phase imbalance of the three supply lines.

* * * * *